United States Patent
Kelley et al.

(10) Patent No.: US 6,936,361 B2
(45) Date of Patent: Aug. 30, 2005

(54) METHOD FOR HUMIDIFYING A FUEL STREAM FOR A DIRECT METHANOL FUEL CELL

(75) Inventors: Ronald James Kelley, Coral Springs, FL (US); Steven Duane Pratt, Plantation, FL (US); Sivakumar Muthuswamy, Plantation, FL (US); Robert Pennisi, Boca Raton, FL (US)

(73) Assignee: Motorola, Inc., Schaumberg, IL (US)

( * ) Notice: Subject to any disclaimer, the term of this patent is extended or adjusted under 35 U.S.C. 154(b) by 121 days.

(21) Appl. No.: 10/403,711

(22) Filed: Mar. 31, 2003

(65) Prior Publication Data

US 2004/0191583 A1 Sep. 30, 2004

(51) Int. Cl.[7] .......................... H01M 8/00; H01M 8/18; H01M 8/04
(52) U.S. Cl. .............................. 429/13; 429/19; 429/22
(58) Field of Search .............................. 429/19, 22, 12, 429/13

(56) References Cited

U.S. PATENT DOCUMENTS

| | | | | |
|---|---|---|---|---|
| 4,365,006 A | * | 12/1982 | Baker | 429/17 |
| 5,432,020 A | * | 7/1995 | Fleck | 429/13 |
| 6,045,772 A | * | 4/2000 | Szydlowski et al. | 423/652 |
| 6,063,515 A | * | 5/2000 | Epp et al. | 429/17 |
| 6,338,472 B1 | * | 1/2002 | Shimazu et al. | 261/78.2 |
| 6,440,594 B1 | * | 8/2002 | Kindler et al. | 429/13 |
| 6,500,573 B1 | | 12/2002 | Simazu et al. | 429/22 |
| 2002/0110714 A1 | | 8/2002 | Andrews et al. | 429/24 |
| 2003/0031908 A1 | | 2/2003 | Bostaph et al. | 429/30 |

FOREIGN PATENT DOCUMENTS

JP     5-54900     * 5/1993     ............ H01M/8/04

* cited by examiner

Primary Examiner—Patrick Joseph Ryan
Assistant Examiner—Julian Mercado
(74) Attorney, Agent, or Firm—Randi L. Karpinia; Larson & Associates PC

(57) ABSTRACT

A method for humidifying a fuel stream for a direct methanol fuel cell. An ultrasonic transducer (122) is used to create a vapor of methanol without heating. Water is also vaporized with an ultrasonic transducer (132) to create a vapor of water without heating. The water vapor and the methanol vapor are combined (240) in a certain ratio to form a humidified fuel vapor which is presented to an anode (112) of the direct methanol fuel cell (110). The ratio of water to methanol can be adjusted automatically by a sensor (180) that monitors the current drawn by the load (170) on the fuel cell.

3 Claims, 2 Drawing Sheets

METHOD FOR HUMIDIFYING A FUEL STREAM FOR A DIRECT METHANOL FUEL CELL

FIELD OF THE INVENTION

This invention relates generally to fuel cells. More particularly, this invention relates to methods of operating and controlling fuel cells.

BACKGROUND OF THE INVENTION

In recent years, nearly all electronic devices have been reduced in size and weight, in particular portable electronic devices such as cellular telephones, two-way radios, laptop computers, personal digital assistants (PDAs). This advancement has been made possible, in part, by the development of new battery chemistries such as nickel-metal hydride, lithium ion, zinc-air, and lithium polymer that enable larger amounts of power to be packaged in a smaller container. Although these new batteries are a tremendous advancement over the previous generations of batteries, they still suffer from the need for sophisticated charging regimens and the slow charging rates. Some have sought to replace electrolytic batteries with fuel cells that catalytically convert a hydrogen molecule to hydrogen ions and electrons, and then extract the electrons through a membrane as electrical power, while oxidizing the hydrogen ions to $H_2O$ and extracting the byproduct water. The tremendous advantage of fuel cells is the potential ability to provide significantly larger amounts of power in a small package, as compared to a battery. In general, the fuel cell technologies can be divided into three categories, namely, fuel cells employing compressed hydrogen gas as fuel, fuel cells employing methanol reformates as fuel, and direct methanol fuel cells. Methanol is more attractive to consumers than gaseous hydrogen, as it is more readily available and can be more easily stored. In direct methanol fuel cells, the methanol is generally mixed with water and presented to the membrane electrode assembly (MEA) where it is converted to hydrogen and carbon dioxide. The methanol must be mixed with water in order to facilitate the catalytic reaction and to prevent the methanol from migrating through the polymer membrane in the MEA and crossing over from the anode side to the cathode side. Although the theoretical ratio of water to methanol is one-to-one (mole basis), in practice the water is mixed with methanol in amounts from 50% to 98% (by volume) in order to prevent crossover.

Polymer electrode membrane (PEM) fuel cells operate most efficiently at temperatures between 60° C. and 80° C. In prior art systems, the mixture of water and methanol is heated prior to introducing it to the MEA to keep the water from condensing. However, heating the fuel/water mixture creates a series of problems. The heated fuel stream further heats the fuel cell and increases the operating temperature of the cell, and increased operating temperature tends to dehydrate the MEA. It would be a significant contribution to the art if there were a method of supplying humidified methanol that did not heat either the water or the methanol.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE INVENTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

A method for humidifying a fuel stream for a liquid feed fuel cell uses an ultrasonic transducer to create a vapor of methanol without heating the methanol. Water is also vaporized with an ultrasonic transducer to create a vapor of water without heating. The water vapor and the methanol vapor are combined to form a humidified fuel vapor, which is then presented to an anode of the direct methanol fuel cell. The water vapor and the methanol vapor are combined in certain proportions, which may either be fixed or variable. If the ratio of water to methanol is variable, then the ratio is a function of the operating load or demand on the fuel cell. The water and methanol can also be pre-mixed prior to vaporizing, and then the mixture is vaporized without heat using an ultrasonic misting device and fed to the fuel cell.

Figure 1:
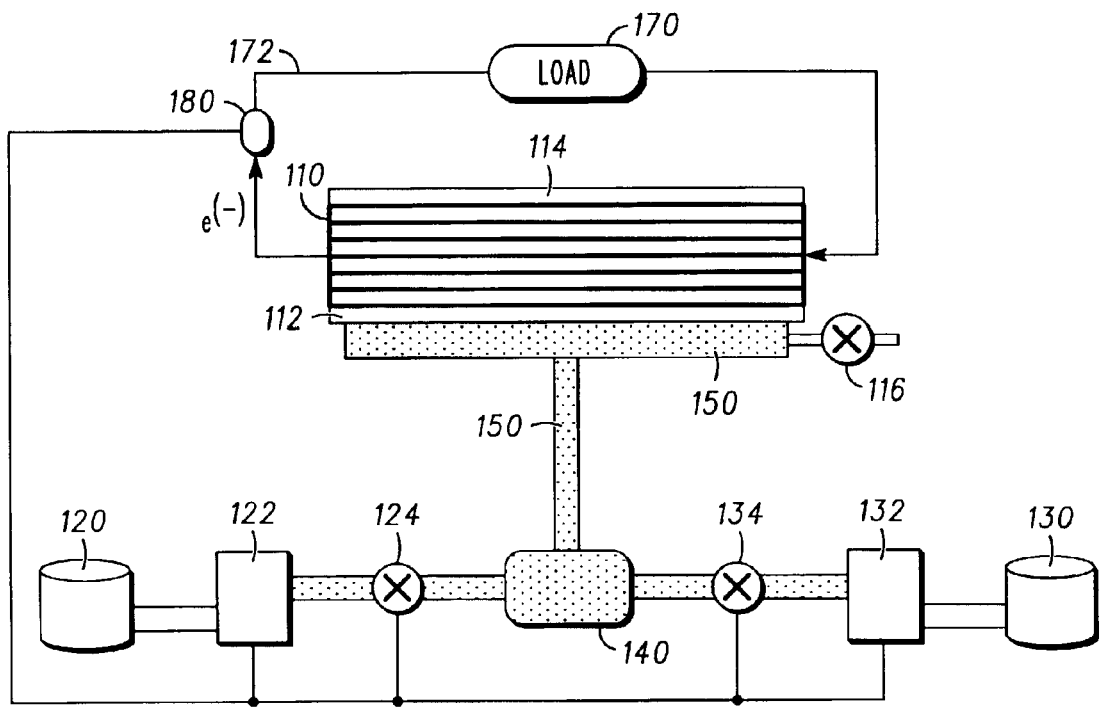
FIGS. 1 and 3 are schematic representations of a fuel cell.
Figure 2:
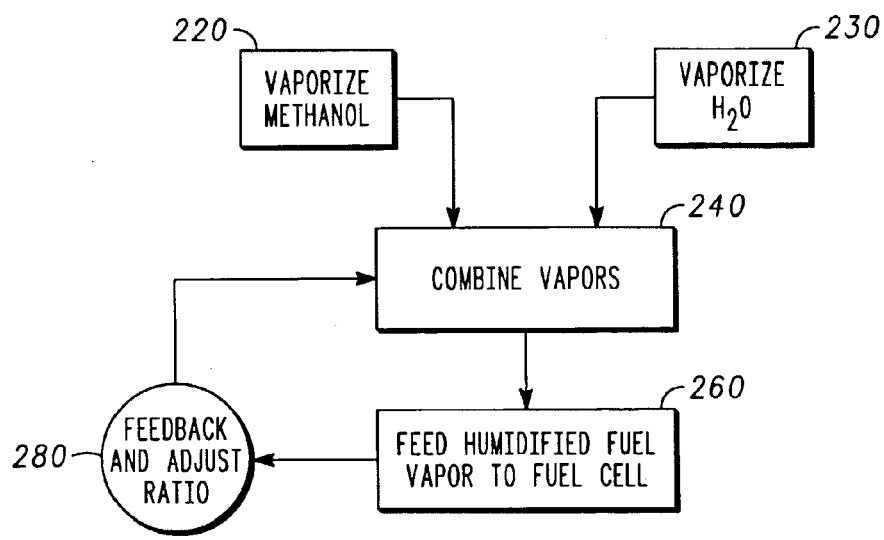
FIGS. 2 and 4 are flow charts depicting methods of humidifying a fuel stream for a direct methanol fuel cell.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding elements in the several views of the drawings. While the invention will be described using methanol as the fuel in a direct methanol fuel cell, other fuels such as ethanol, propanol, isopropanol, trimethoxymethane, dimethoxymethane, trioxane, formaldehyde, and formic acid could also be employed. Referring now to FIGS. 1 and 2, a direct methanol fuel cell 110 contains a series of membrane electrode assemblies (MEA) arranged in conventional manner. One side of the fuel cell is known as the anode side 112 and the other side is the cathode side 114. A supply of methanol 120 is used as the energy source to power the fuel cell. In direct methanol fuel cells, methanol and water are catalytically converted into hydrogen by a noble metal catalyst, such as platinum or ruthenium, at the anode as follows:

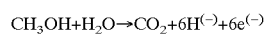

The methanol from the supply 120 is converted 220 into a mist, vapor, or gas by means of one or more ultrasonic misters 122. The ultrasonic mister 122 comprises a transducer having a metal disk or piezoelectric element that vibrates in response to an electrical signal from an oscillator, and the transducer is submerged in the liquid methanol, producing micro-bubbles that burst into a mist or vapor as they rise to the surface of the liquid. In our preferred embodiment, we employ conventional ultrasonic systems, but other means of atomizing a liquid into a vapor or mist can also be used, such as microelectromechanical systems (MEMS), jet atomization through a venturi, or electrostatic atomization and spraying using electrical charge injection to break a liquid stream into droplets.

By using an ultrasonic or other misting system to generate the vapors, heat is not needed, as it is in the prior art, to vaporize the methanol. This decouples heat from the fuel supply, making the fuel cell easier to operate on a continuous basis. The cool mist or vapor produced by the ultrasonic transducer does not add to the heat load of the fuel cell system. One skilled in the art will appreciate that while an ultrasonic transducer immersed in a liquid will produce some gaseous products, mainly it produces a mist or vapor of very fine droplets. As noted in the reaction above, water is needed to catalytically convert the methanol into hydrogen, and a supply of water 130 is used for this purpose. The water from the supply 130 is converted 230 into a mist, vapor, or gas by means of one or more ultrasonic misters 132. This decouples the heat from the water vapor, making the fuel cell easier to operate on a continuous basis. The cool mist or vapor produced by the ultrasonic transducer does not add to the heat load of the fuel cell system.

The methanol vapors and the water vapors are then combined 240, for example in a suitable mixing chamber 140, to form a humidified fuel vapor 150 that is then fed 260 to the anode side 112 of the fuel cell 110, where the half cell reaction

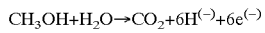

occurs. The hydrogen ions migrate through the MEA to the cathode side 114 where they combine with oxygen from the air to produce water according to the half-cell reaction:

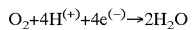

An appropriate release valve 116 releases the carbon dioxide generated, and the electrons are routed through appropriate wiring 172 to a load 170 such as a cellular telephone, two-way radio, laptop computer, personal digital assistant, or other portable electronic devices.

In the simplest form of our invention, the methanol and water are combined in a predetermined, fixed ratio. However, since the operating demands of the fuel cell can change depending on the duty cycle of the electronic device it is powering, it would be useful to be able to change the ratio of water to methanol from the stoichiometrically correct 1/1 mole ratio to a ratio that optimizes the operational parameters of the PEM fuel cell. A sensor 180 monitors the current flow in the electric feed 172 to the load 170 and adjusts 280 the intensity of the ultrasonic transducers 122 and/or 132 accordingly to either increase or decrease the amount of water vapor that is mixed with the methanol vapor. Alternatively, the sensor adjusts a metering valve 124 and/or 134 in the respective methanol and water streams to increase or decrease the amount of water vapor that is mixed with the methanol vapor. In this way, the amount of water in the methanol can be varied from 0 to 100%, depending on the needs of the fuel cell.

Figure 3:
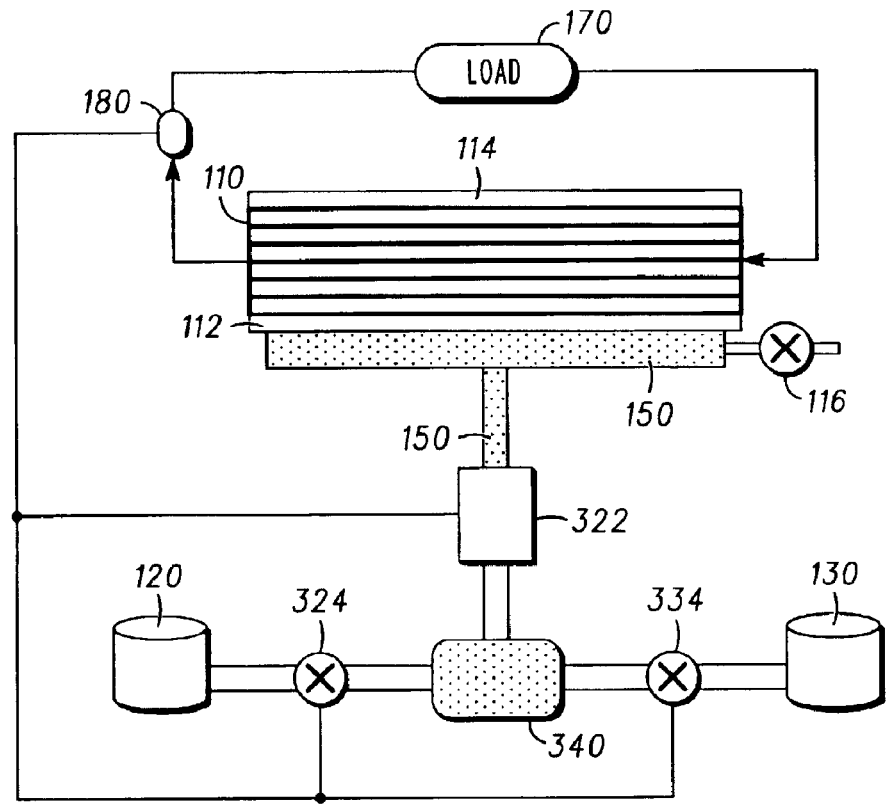
Figure 4:
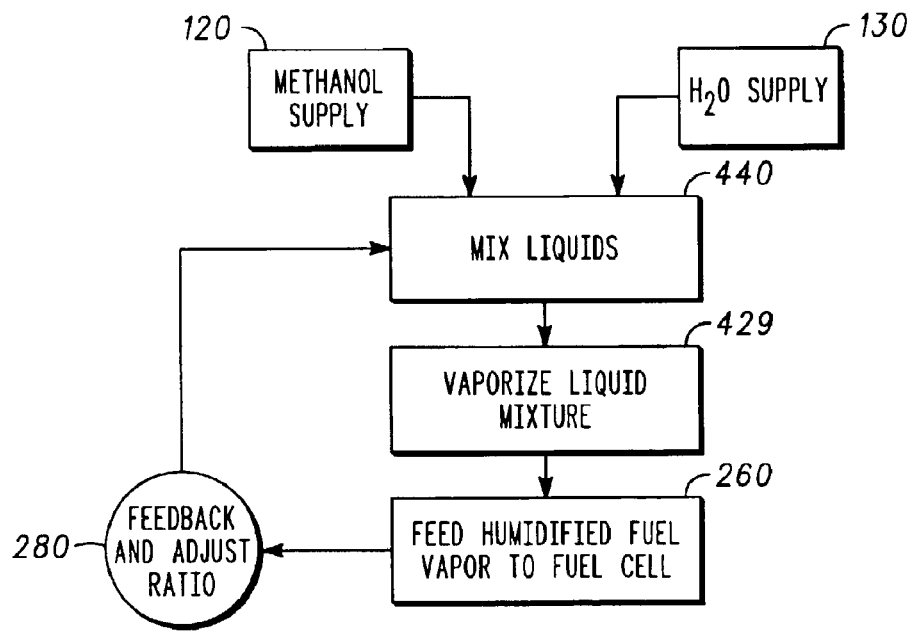

Turning now to FIGS. 3 and 4, in an alternative embodiment of our invention, a direct methanol fuel cell 110 contains a series of membrane electrode assemblies (MEA) arranged in conventional manner. One side of the fuel cell is known as the anode side 112 and the other side is the cathode side 114. A supply of methanol 120 is used as the energy source to power the fuel cell and a supply of water 130 is provided to aid in the catalytic conversion of the methanol into hydrogen. The liquid water and liquid methanol are fed into a mixing chamber 340, such as a motionless mixer, where they are thoroughly mixed 440 and the liquid mixture is then vaporized 429 using one or more ultrasonic mister 322 to form a humidified fuel vapor 150 that is then fed 260 to the anode side 112 of the fuel cell 110. The ultrasonic mister 322 comprises a transducer having a metal disk or piezoelectric element that vibrates in response to an electrical signal from an oscillator, and the transducer is submerged in the liquid methanol, producing micro-bubbles that burst into a mist or vapor as they rise to the surface of the liquid. One can use conventional ultrasonic systems, or a microelectromechanical systems(MEMS) to mist the liquid. By using an ultrasonic system to generate the vapors, heat is not needed to create methanol gas. The cool mist or vapor produced by the ultrasonic transducer does not add to the heat load of the fuel cell system. The hydrogen ions migrate through the MEA to the cathode side 114 where they combine with oxygen from the air to produce water. An appropriate release valve 116 releases the carbon dioxide generated, and the electrons are routed through appropriate wiring 172 to a load 170 such as a cellular telephone, two-way radio, laptop computer, personal digital assistant, or other portable electronic devices.

As in our previous embodiment, in the simplest form of our invention, the liquid methanol and liquid water are combined in a predetermined, fixed ratio. However, since the operating demands of the fuel cell can change depending on the duty cycle of the electronic device it is powering, it would be useful to be able to change the ratio of water to methanol from the stiochiometrically correct 1/1 mole ratio to a mixture that optimizes the operational parameters of the PEM fuel cell. A sensor 180 monitors the current flow to the load 170 and adjusts 280 the intensity of the ultrasonic transducers 322 accordingly to either increase or decrease the amount of water vapor that is mixed with the methanol vapor. Alternatively, the sensor 180 adjusts a metering valve 324 and/or 334 in the respective liquid methanol and liquid water feeds to increase or decrease the amount of water that is mixed with the methanol. In this way, the amount of water in the methanol can be varied from 0 to 100%, depending on the needs of the fuel cell.

In summary, without intending to limit the scope of the invention, operation of a direct methanol fuel cell according to a method consistent with certain embodiments of the invention can be carried out by creating vapors of methanol and water without the use of heat by generating a mist or vapor using ultrasonics. Those skilled in the art will recognize that the present invention has been described in terms of exemplary embodiments based upon use of a PEM fuel cell and ultrasonic transducers. However, the invention should not be so limited, since other variations will occur to those skilled in the art upon consideration of the teachings herein, for example in addition to methanol, other fuels such as ethanol, propanol, isopropanol, trimethoxymethane, dimethoxymethane, trioxane, formaldehyde, and formic acid could also be employed. While the invention has been described in conjunction with specific embodiments, it is evident that many alternatives, modifications, permutations and variations will become apparent to those of ordinary skill in the art in light of the foregoing description.

Accordingly, it is intended that the present invention embrace all such alternatives, modifications and variations as fall within the scope of the appended claims.

What is claimed is:

1. A method for humidifying a fuel stream for a direct methanol fuel cell, comprising:
   producing a methanol vapor by mechanically vaporizing methanol using a first ultrasonic transducer;
   producing a water vapor by mechanically vaporizing water using a second ultrasonic transducer;
   combining the water vapor and the methanol vapor by means of one or more valves that are responsive to the operating load on the fuel cell to form a humidified fuel vapor; and
   powering a direct methanol fuel cell by providing the humidified fuel vapor to an anode of the fuel cell.

2. A method for humidifying a fuel stream for a direct methanol fuel cell, comprising:
   producing a methanol vapor by mechanically vaporizing methanol and producing a water vapor by mechanically vaporizing water, by means of an ultrasonic transducer;
   combining the water vapor and the methanol vapor in a ratio that is a function of the operating load on the fuel cell, by means of one or more valves that are responsive to the operating load on the fuel cell, to form a humidified fuel vapor; and
   powering a direct methanol fuel cell by providing the humidified fuel vapor to an anode of the fuel cell.

3. A method for humidifying a fuel stream for a direct methanol fuel cell, comprising:
   providing a supply of water;
   providing a supply of methanol;
   mixing the water and the methanol in a predetermined ratio by means of one or more valves that are responsive to the operating load on the fuel cell;
   producing a humidified fuel vapor by mechanically vaporizing the mixed water and methanol using an ultrasonic transducer; and
   powering a direct methanol fuel cell by providing the humidified fuel vapor to an anode of the fuel cell.

* * * * *